(12) United States Patent
Sasaki

(10) Patent No.: US 8,590,874 B2
(45) Date of Patent: Nov. 26, 2013

(54) FIXING STRUCTURE OF DISTRIBUTION MEMBER

(75) Inventor: Kei Sasaki, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 668 days.

(21) Appl. No.: 12/747,131

(22) PCT Filed: Dec. 9, 2008

(86) PCT No.: PCT/JP2008/072302
§ 371 (c)(1),
(2), (4) Date: Jun. 9, 2010

(87) PCT Pub. No.: WO2009/084383
PCT Pub. Date: Jul. 9, 2009

(65) Prior Publication Data
US 2010/0270720 A1 Oct. 28, 2010

(30) Foreign Application Priority Data
Dec. 27, 2007 (JP) .................................. 2007-336684

(51) Int. Cl.
B23Q 1/00 (2006.01)
B23Q 3/00 (2006.01)
B23Q 3/18 (2006.01)

(52) U.S. Cl.
USPC ............. 269/54.1; 269/50; 269/53; 269/54.5; 269/67; 269/76; 269/289 R; 269/60; 269/900; 310/71

(58) Field of Classification Search
USPC ...... 269/53, 50, 54.5, 67, 76, 289 R, 60, 900, 269/54.1; 310/71
See application file for complete search history.

(56) References Cited

U.S. PATENT DOCUMENTS 5,320,007 A * 6/1994 Weirauch ........................ 82/1.11
2003/0173842 A1* 9/2003 Kobayashi et al. ............. 310/71

FOREIGN PATENT DOCUMENTS

| JP | 5-063399 A | 3/1993 |
| JP | 6-153435 A | 5/1994 |
| JP | 2002-064958 A | 2/2002 |
| JP | 2002-199634 A | 7/2002 |
| JP | 2004-347492 A | 12/2004 |
| JP | 2006-180615 A | 7/2006 |
| JP | 2007-312559 A | 11/2007 |

* cited by examiner

Primary Examiner — Monica Carter
Assistant Examiner — Nirvana Deonauth
(74) Attorney, Agent, or Firm — Sughrue Mion, PLLC

(57) ABSTRACT

A fixing structure (10) of a distribution member has a plurality of pins provided on one of an annular distribution member and a stator in a predetermined arrangement relation in the circumferential direction, and a plurality of holes provided in the other one of the annular distribution member and the stator so that the plurality of pins are fitted thereinto, respectively. In the fixing structure, each pin and a corresponding hole form one fitting set and the tightening margin of each fitting set has a different value.

6 Claims, 3 Drawing Sheets

FIXING STRUCTURE OF DISTRIBUTION MEMBER

BACKGROUND OF THE INVENTION

1. Field of the Invention

The present invention relates generally to a structure for fixing a distribution member, and particularly to a fixing structure of an annular distribution member and a stator.

2. Description of the Related Art

In a three phase rotating electric machine having a stator and a rotor, it is normally necessary that a bus bar be provided for each phase portion of coils, so as to link coils of the same phase together among different phase portions of coils wound around a stator of the rotating electric machine. For example, Japanese Patent Laid-Open Publication 2006-180615 (Patent Document 1) discloses a stator of a rotating electric machine in which different phase portions of coils are wound around an annular core and the coils of a same phase are linked by an annular bus bar arranged circumferentially on an annular core. A bus bar is provided for each phase and arranged opposite to the face of the coils disposed on the side of the core. The bus bars of different phases are arranged in parallel with each other on the side of the core in such a manner that the bus bars are staggered and zigzag around the annular periphery of the core. In such a structure, all connection points between the coils and the bus bars are provided on the circumference of the same circle. Each end (or connection terminal) of the coil is connected to each bus bar using a linkage cylinder which is fitted into a connecting hole and a cylindrical connector which is fitted into the linkage cylinder. The linkage cylinder and the connector have longitudinal slits, and the fitting surfaces thereof are tapered so that when the connector is fitted into the linkage cylinder, the diameter of the cylinder increases, while the diameter of the connector decreases.

Patent Document 1: Japanese Patent Laid-Open Publication 2006-180615

SUMMARY OF THE INVENTION

With the configuration described Patent Document 1, the bus bars can be secured to the stator. However, if the configuration of the Patent Document 1 is used without any modification to secure the bus bars to the stator, accurate positioning of the bus bars relative to the stator is a complex and difficult task, because the plurality of coil ends of the coils arranged on the stator must be inserted simultaneously into a plurality of connecting holes formed in the bus bars; if, for example, there are 18 teeth formed on one stator with the coil wound around each tooth, the position of the coil end relative to the connecting hole must be adjusted repeatedly.

An object of the present invention is to provide a fixing structure of a distribution member which facilitates positioning of a bus bar and a stator.

A fixing structure of a distribution member according to the present invention includes a plurality of pins provided on one of an annular distribution member and a stator in a predetermined pattern in the circumferential direction, and a plurality of holes provided in the other one of the annular distribution member and the stator so that the plurality of pins are fitted thereinto. In the fixing structure, each pin and a corresponding hole form one fitting set and the tightening margin of each fitting set has a different value.

In the fixing structure of a distribution member according to the present invention, the plurality of pins includes primary reference pins and secondary reference pins, the secondary reference pins having a wider tightening margin with corresponding holes than the tightening margin of the primary reference pins with the corresponding holes. It is preferable that the number of the secondary reference pins is greater than the number of the primary reference pins.

In the fixing structure of a distribution member according to the present invention, it is preferable that the plurality of holes have the same diameter, that the tip end of the plurality of pins has a smaller diameter than the diameter of the plurality of holes, and that the plurality of pins are tapered in a manner that the diameter of the pins gradually increases from the tip end to the base end thereof, with the diameter of the base end of the pins being larger than the diameter of the plurality of holes. It is also preferable that the tip end of the secondary reference pins has a smaller diameter than the tip end of the primary reference pins.

In the fixing structure of a distribution member according to the present invention, it is preferable that the tapered shape of the plurality of pins is formed using a plurality of ribs provided on each pin in the circumferential direction.

In the fixing structure of a distribution member according to the present invention, it is further preferable that the plurality of pins are provided on the distribution member and the plurality of holes are provided on the stator.

In the fixing structure of a distribution member according to the present invention, it is also preferable that the primary reference pins are provided in the vicinity of a connector portion which is provided to take out each phase of coils wound around the stator.

With the above structure including the plurality of pins provided circumferentially in a predetermined relationship and the plurality of holes provided to receive each of the plurality of pins, with each pin and the corresponding hole forming one fitting set, the tightening margin of each fitting set has a different value, and the fitting set having a large tightening margin is used for positioning by press-fit. This facilitates positioning of the stator and the distribution member which serves to allocate bus bars, compared to the case where all fitting sets have the same fitting margin. In other words, the positioning of the stator and the bus bars can be accomplished much more easily.

In the above structure, the number of the secondary reference pins having a large tightening margin with the corresponding holes is greater than the number of the primary reference pins having a small tightening margin with the corresponding holes. Thus, because the fitting set having a large tightening margin is used for positioning, the accuracy of positioning can be improved.

Further, in the above structure, the plurality of holes have the same diameter, and the plurality of pins are tapered in a manner that the diameter of the pins gradually increases from the tip end to the base end thereof, with the diameter of the base end of the pins being larger than the diameter of the holes. The tip end of the secondary reference pins has a smaller diameter than the tip end of the primary reference pins. Because many secondary reference pins having such a small diameter are provided, the positioning is facilitated during an early stage of the insertion process.

PARTS LIST

10: Fixing Structure
12: Connector Portion
14: Bus Bar Supporting Portion
20: Hole
30: Primary Reference Fitting Portion
32: Primary Reference Pin
34: Primary Reference Slit
36: Primary Reference Rib
40, 50: Secondary Reference Fitting Portion
42: Secondary Reference Pin Portion
44: Secondary Reference Slit
46: Secondary Reference Rib

DETAILED DESCRIPTION OF EXAMPLE EMBODIMENT

A preferred embodiment of the present invention will be described below with reference to the attached drawings. In the following example, one primary reference pin and two secondary reference pins are provided, but the number of pins is not limited thereto as long as the number of primary reference pins is less than the number of the secondary reference pins.

Figure 1:
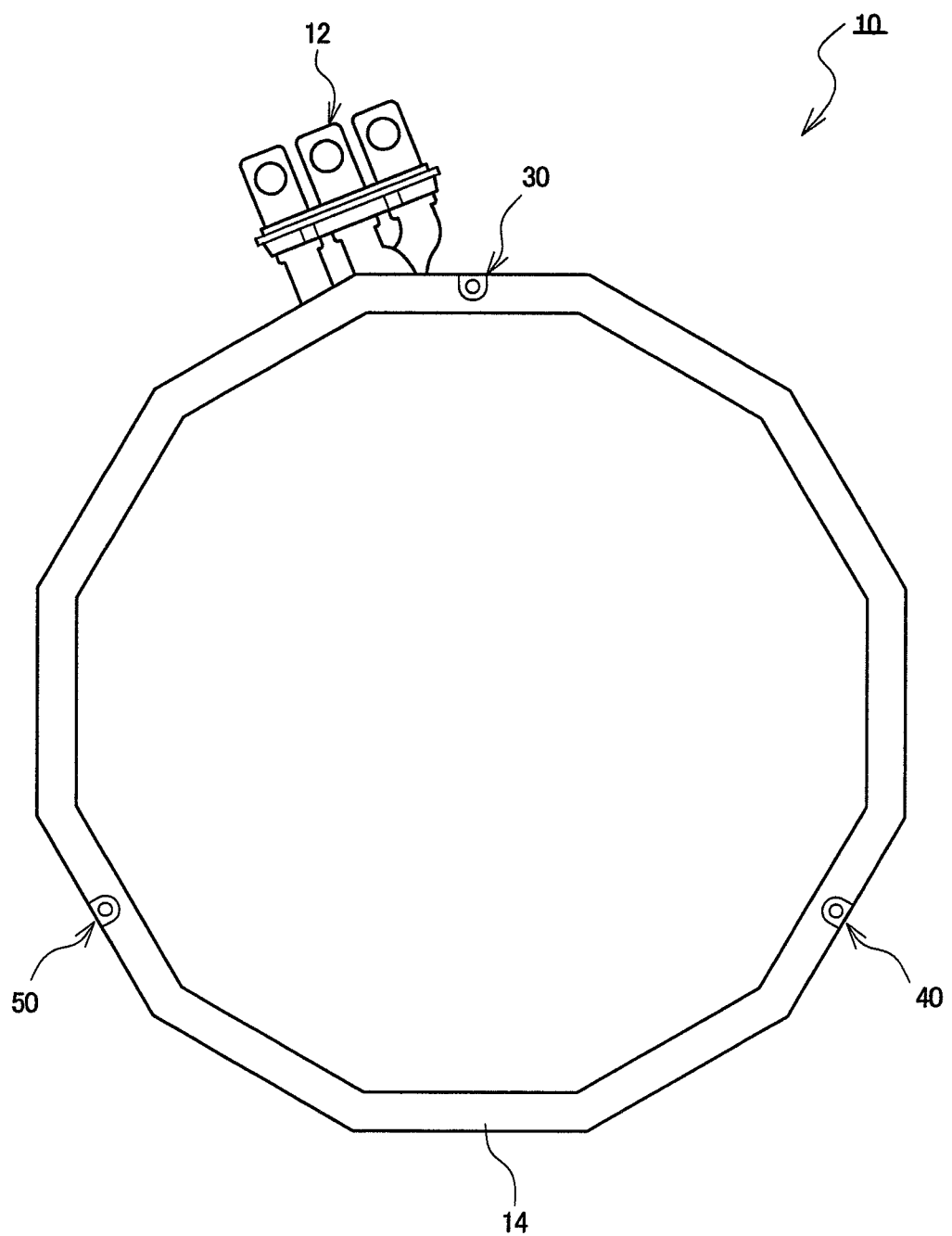
FIG. 1 shows a fixing structure of a distribution member according to an embodiment of the present invention.
Figure 2:
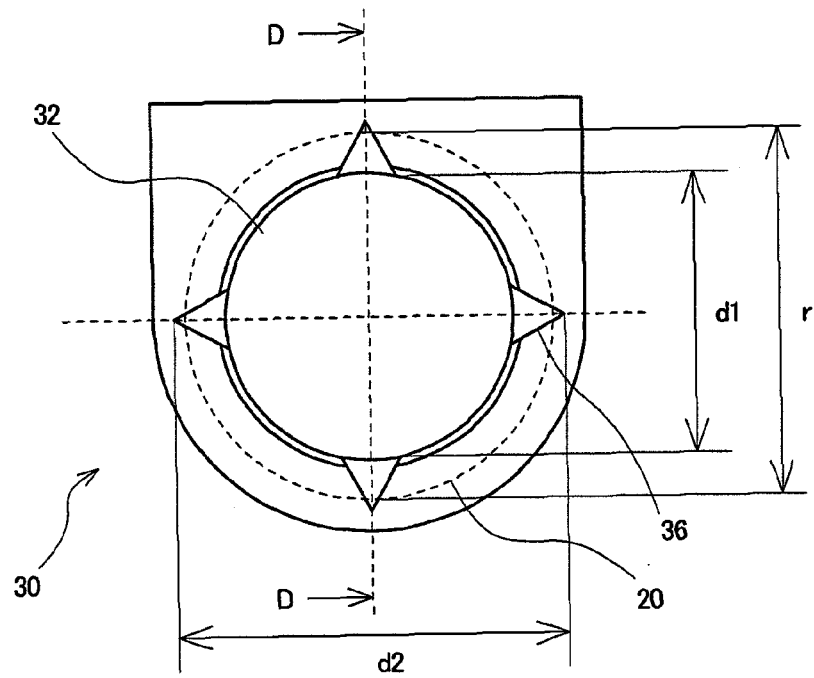
FIG. 2 is a top view of a primary reference fitting portion of FIG. 1.
Figure 3:
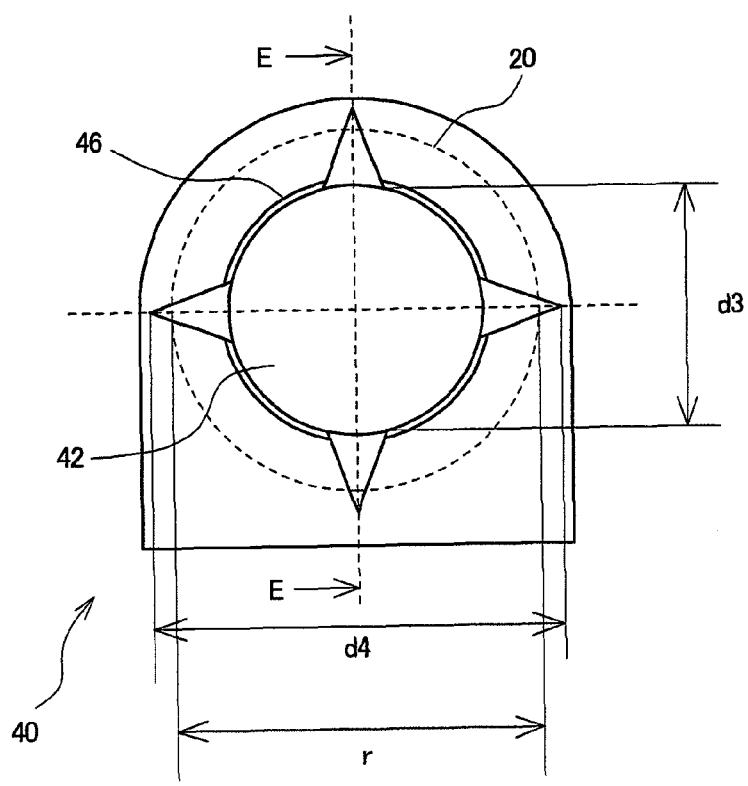
FIG. 3 is a top view of a secondary reference fitting portion of FIG. 1.
Figure 4:
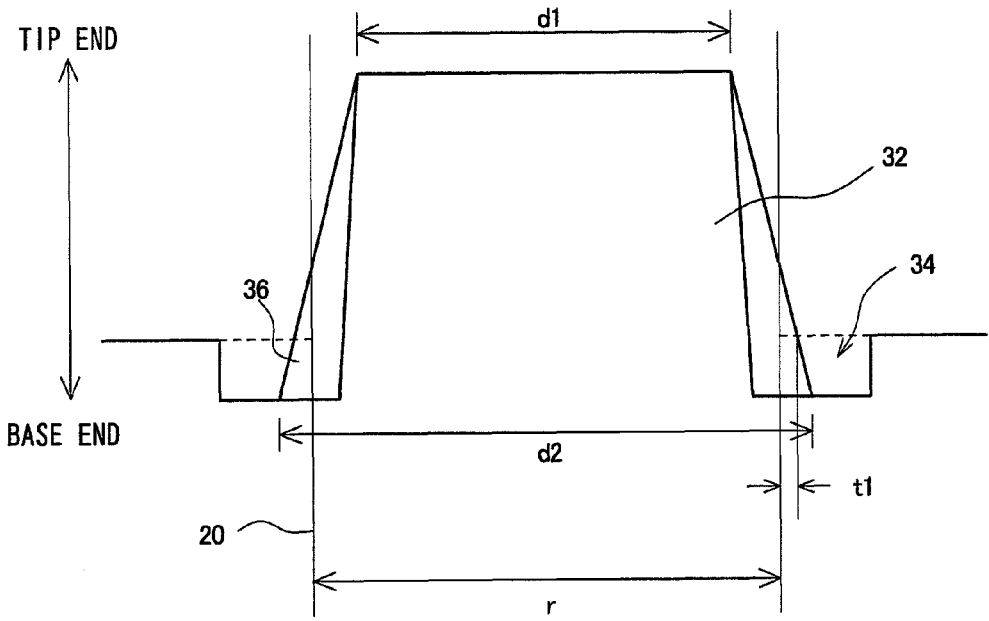
FIG. 4 is a sectional view cut along a line D-D of FIG. 2.
Figure 5:
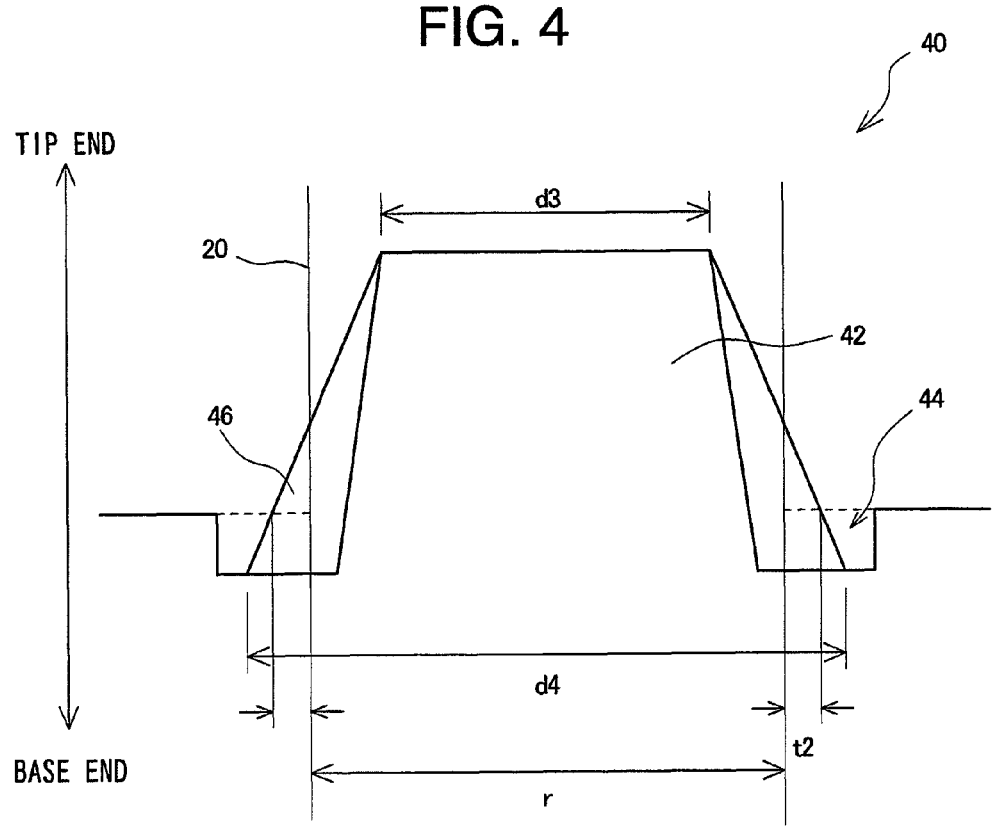
FIG. 5 is a sectional view cut along a line E-E of FIG. 3.

FIG. 1 shows a fixing structure 10 of a distribution member. A hole provided in the stator and a corresponding pin provided on the annular distribution member form a fitting set. In the example shown in FIG. 1, the primary reference fitting portion 30 and secondary reference fitting portions 40, 50 correspond to such a fitting set. FIGS. 2 and 3 are top views of the primary reference fitting portion 30 and the secondary fitting portion 40, respectively, of FIG. 1. FIGS. 4 and 5 are sectional views along the line D-D of FIG. 2, and the line E-E of FIG. 3, respectively. The fixing structure 10 of the distribution member is used for fixing the stator and the annular distribution member. The fixing structure 10 of the distribution member includes a bus bar supporting portion 14, a connector portion 12, the primary reference fitting portion 30 and the secondary reference fitting portions 40, 50.

The bus bar supporting portion 14 has an annular supporting slit into which a plurality of connecting bus bars are inserted in such a manner that the bus bars can be insulated from each other. For example, in the three phase rotating electric machine, the bus bar supporting portion 14 has four annular supporting slits corresponding to three phases and the neutral point.

The connector portion 12 is provided for supplying alternating current to each of U, V, and W phase coils wound around the stator to activate the three phase rotating electric machine. The connector portion 12 is a connector which is provided along a portion of the outer periphery of the bus bar supporting portion 14 and protrudes outwards.

The primary reference fitting portion 30 includes a primary reference pin 32, a primary reference rib 36, and a hole 20. The primary reference fitting portion 30 is arranged in close proximity to the connector portion 12.

The primary reference pin 32 is a protrusion provided on the bus bar supporting portion 14, and is tapered in such a manner that the cross sectional area of the pin gradually increases from the tip end to the base end thereof. As shown in FIG. 2, the primary reference pin 32 has a circular tip end, while the cross section of the primary reference pin 32 is in a generally trapezoidal shape when viewed along the line D-D as shown in the sectional view of FIG. 4. The primary reference pin 32 is inserted into the hole 20, described below, from the tip end side to secure the stator to the bus bar supporting portion 14.

The primary reference ribs 36 are generally triangular trapezoidal portions provided on the bus bar supporting portion 14 and arranged at a predetermined distance from each other by 90° around the primary reference pin 32 when seen from the above. The cross sectional area of the primary reference ribs 36 shown in the top view of FIG. 2 increases from the tip end toward the base end thereof, with the area of the tip end being smaller than the holes 20, and the area of the base end being larger than the holes.

The holes 20 are through holes arranged at a predetermined distances from each other by 120° around the stator. The holes 20 have a diameter "r" and are arranged at predetermined positions so as to fit into any of the primary reference pins 32, the secondary reference pins 42, and other secondary reference pins of the secondary reference fitting portion 50.

The secondary reference fitting portion 40 includes a secondary reference pin 42, a secondary reference rib 46, and the hole 20. The secondary reference fitting portions 40, 50 are arranged at a predetermined distance from each other by 120° around the bus bar supporting portion 14 relative to the primary reference fitting portion 30. Thus, as described above, it is possible to fit the primary reference pins 32, and the secondary reference pins 42, and the secondary reference pins of the secondary reference fitting portion 50 into the holes 20 arranged at a distance from each other by 120° around the stator. It should be noted that, because the secondary reference fitting portion 40 and the secondary reference fitting portion 50 have the same configuration, although only the secondary reference fitting portion 40 will be described in the following, this description can be applied to both components.

Similar to the primary reference pin 32, the secondary reference pin 42 is also a protruding portion provided on the bus bar supporting portion 14 and tapered in a manner that the cross sectional area of the pin gradually increases from the tip end to the base end thereof. As shown in FIG. 3, the secondary reference pin 42 has a circular tip end, while the cross section of the secondary reference pin 32 is in a generally trapezoidal shape when cut along the line E-E as shown in the sectional view of FIG. 5. The secondary reference pins 42 are inserted into the holes 20 from the tip end side to secure the stator to the bus bar supporting portion 14.

Similar to the primary reference ribs 36, the secondary reference ribs 46 are generally triangular trapezoidal portions provided on the bus bar supporting portion 14 and arranged at a predetermined distances from each other by 90° around the secondary reference pin 42 when seen from the above. The cross sectional area of the secondary reference ribs 46 shown in the top view of FIG. 3 gradually increases from the tip end toward the base end thereof, with the area of the tip end being smaller than the holes 20 and the area of the base end being larger than the holes.

When the primary reference fitting portion 30 is compared to the secondary reference fitting portion 40, the diameter of the tip end of the primary and secondary reference pin portions 32 and 42 is d1 and d3 (d1>d3), as shown in FIGS. 2 and 3. The width of the base end including the primary and secondary reference ribs 36 and 46 is d2 and d4 (d4>d2), as also shown in FIGS. 2 and 3. As the diameter of the hole 20 is "r", as mentioned above, the order of the length of d1, d2, d3, and d4 relative to r is d4>d2>r>d1>d3. Therefore, as shown in FIGS. 4 and 5, the relationship of a tightening margin t1 of the primary reference fitting portion 30 relative to a tightening margin t2 of the secondary reference fitting portion 40 is t2>t1.

Next, the operation of the above structure will be described. During the assembly step of the rotating electric machine, the primary reference pin 32, the secondary reference pin 42, and another secondary reference pin of the secondary reference fitting portion 50 of the bus bar supporting portion 14 formed as the annular distribution member are inserted into the holes 20 formed in the stator. Then, the primary reference ribs 36, the secondary reference ribs 46, and the secondary reference ribs of the secondary reference fitting portion 50 are inserted into the holes in a press-fitting manner to secure the bus bar supporting portion 14 to the stator. As described above, because the diameter (r) of the hole 20> the diameter (d1) of the tip end of the primary reference pin 32> the diameter (d3) of the tip end of the secondary reference pin 42, the pins can be inserted into the holes in a loose fitting manner during the beginning of the insertion process. In other words, positioning of the components during the early stages of insertion is made easier.

By considering the relationship t2>t1, where t1 is the primary reference tightening margin which is the tightening margin of the primary reference fitting portion 30 and t2 is the secondary reference tightening margin which is the tightening margin of the secondary reference fitting portion 40 (note that the tightening margin of the secondary reference fitting portion 50 is also t2), when the primary reference ribs 36 and the secondary reference ribs 46 and the secondary reference rib of the secondary reference fitting portion 50 are inserted into the holes by press-fit, the secondary reference fitting portions 40, 50 having a wider tightening margin can be used for positioning. In addition, because the number of the secondary reference fitting portions 40, 50 is greater than the number of the primary reference fitting portion 30, the secondary reference fitting portions 40, 50 are dominant and the positioning accuracy of the bus bar supporting portion 14 and the stator can therefore be improved.

At the end of the insertion process, the bus bar supporting portion 14 and the stator can be tightly secured using the secondary reference fitting portions 40, 50 having a wider tightening margin, because the number of the secondary reference fitting portions 40, 50 is greater than the number of the primary reference fitting portions 30. Thus, by widening the tightening margin of the secondary reference fitting portions 40, 50 where many pins are provided, floating of the bus bar supporting portion 14 can be alleviated during the assembly of the rotating electric machine.

It should be noted that, in the above structure, the primary reference ribs 36 and the secondary reference ribs 46 and the secondary reference rib of the secondary reference fitting portion 50 are used to form the tapered shape of the pins, so that the cross sectional area of the pins can be decreased compared to the tapered pins formed without using the ribs. This contributes to diminish the fitting load of installation.

Also, as the width of the tip end of the secondary reference pin 42 is smaller than the width of the tip end of the primary reference pin 32, that is, d3<d1, and the primary reference fitting portion 30 is arranged in the vicinity of the connector portion 12, rattling which may otherwise occur near the connector portion 12 during assembly can be prevented.

What is claimed is:

1. A fixing structure of a distribution member, comprising:
a plurality of pins provided on a bus bar supporting portion of one of an annular distribution member and a stator in a predetermined arrangement relation in the circumferential direction, the plurality of pins including a primary reference pin having a cross sectional area which gradually increases from a tip end to a base end thereof, and a secondary reference pin having a cross sectional area which gradually increases from a tip end to a base end thereof, with the diameter of the tip end of the secondary reference pin being smaller than the diameter of the tip end of the primary reference pin; and
a plurality of holes provided in the other one of the annular distribution member and the stator so that the plurality of pins are fitted thereinto, respectively,
wherein a secondary reference tightening margin formed by fitting the secondary reference pin with a corresponding hole for the secondary reference pin is wider than a primary reference tightening margin formed by fitting the primary reference pin with a corresponding hole for the primary reference pin.

2. A fixing structure of a distribution member according to claim 1, wherein the number of the secondary reference pins is greater than the number of the primary reference pins.

3. A fixing structure of a distribution member according to claim 2, wherein:
the plurality of holes have the same diameter,
the tip end of the primary reference pin and the secondary reference pin each have a smaller diameter than the diameter of the plurality of holes.

4. A fixing structure of a distribution member according to claim 3, wherein:
the tapered shape of the primary reference pin and the secondary reference pin is formed using a plurality of ribs provided on each pin in a circumferential direction.

5. A fixing structure of a distribution member according to claim 1, wherein:
the primary reference pin and the secondary reference pin are provided on the distribution member, and the plurality of holes are provided on the stator.

6. A fixing structure of a distribution member according to claim 2, wherein:
the primary reference pin is provided in the vicinity of a connector portion which protrudes outward from a portion of an outer periphery of the bus bar supporting portion.

* * * * *